March 7, 1967 R. B. GRONTKOWSKI 3,308,428
AUTOMATIC TIMING ARRANGEMENT FOR AUTOMOTIVE
TURN SIGNALLING SYSTEM
Filed Sept. 10, 1963 2 Sheets-Sheet 1

FIG.1

*INVENTOR.*
Ray B. Grontkowski
BY

ATTORNEYS

March 7, 1967  R. B. GRONTKOWSKI  3,308,428
AUTOMATIC TIMING ARRANGEMENT FOR AUTOMOTIVE
TURN SIGNALLING SYSTEM Filed Sept. 10, 1963

*INVENTOR.*
Ray B. Grontkowski
BY

ATTORNEYS

United States Patent Office 3,308,428
Patented Mar. 7, 1967

3,308,428
AUTOMATIC TIMING ARRANGEMENT FOR AUTOMOTIVE TURN SIGNALLING SYSTEM
Raymond B. Grontkowski, Bronx, N.Y., assignor to Lehigh Valley Industries, Inc., New York, N.Y., a corporation of Delaware
Filed Sept. 10, 1963, Ser. No. 307,944
13 Claims. (Cl. 340—81)

This invention relates to turn signalling systems for automotive vehicles and, more particularly, to novel timing arrangements for such turn signalling systems.

One of the problems with automotive vehicle turn signalling systems is that of cancelling a turn signal indication after the projected turn or route deviation has been completed. On passenger vehicles, after the steering wheel has made a predetermined degree of turning movement in one direction and is then returned to the straight ahead position, the turn signal indication is automatically cancelled. However, if the degree of turning movement is less than such predetermined degree, the turn signal indication is not cancelled. A turn of this type may occur, for example, where the turn signal switch is operated to indicate a change of lane, followed by a change of lane in the reverse direction. Generally, the amount of turning movement in the vehicle, under circumstances of changing a lane on a multi-lane highway is insufficient to effect automatic cancelling of the turn signal indication, and it is common observation that, for example, a vehicle having given a left turn indication signalling a movement from a right lane into a lane to the left will frequently proceed along the highway with the left turn indicator signal still flashing even though there is no intention to make any further diverginary movements to the left. This is confusing both to approaching and following drivers.

An even more serious problem arises in connection with turn signal systems installed on commercial vehicles such as buses and trucks. In such case, the gearing ratio between the steering wheel and the front wheels is such that it is impractical to use cams or the like for automatically cancelling the turn signal indication after return of the steering wheel following a predetermined movement. Accordingly, reliance has to be placed upon the operator of the vehicle to manually cancel the turn signal indication. This also is unsatisfactory as, frequently, turn signal indications on buses and trucks remain operative long after the bus or truck has completed its indicated turning movement.

As a solution to this problem, it has been proposed to effect cancellation of a turn signal system a predetermined time interval after the turn signal is made operative, and systems operating on the elapsed time cancelling principle are used in some passenger vehicles. However, this system by itself is also unsatisfactory for various reasons.

For example, if the operator of an automotive vehicle signals a left-hand turn and then is held up by a traffic light, the turn signal indication will be automatically cancelled before the operator has made his projected turn or before the operator has completed his projected turn. This again requires manual attention on the part of the operator to restore the turn signal indication to the operative condition after the predetermined time interval has expired.

To overcome these difficulties, the present invention is directed to a novel cancelling arrangement for automotive vehicle signalling systems in which the turn signal indication is cancelled after a predetermined time interval, but with the further provision that the start of the predetermined time interval may be delay if the vehicle brakes are applied, as when the vehicle is stopped at a traffic light, or if the steering wheel is in a position other than straight ahead. For example, if the operator of the vehicle operates the turn signal switch to indicate a left turn and then proceeds to make the turn, with restoration of the steering wheel to the straight ahead position, the timing means of the present invention insures cancellation of the turn signal indication after a predetermined time interval. However, should the operator of the vehicle have to halt his vehicle, as at a traffic light, by application of the brakes, the start of the timing period is delayed, or the timing period is "re-started" only when the brakes have been released and the vehicle has begun to move to make the turn.

These functions are accomplished by a novel circuit arrangement involving an R-C timing circuit in association with a transistor, with the charging or discharging of the condenser in the R-C circuit controlling the time period during which the signal is maintained in operation, the value of the time period being further controlled by the resistance of the R-C combination.

For an understanding of the principles of the invention, reference is made to the following description of typical embodiments thereof as illustrated in the accompanying drawings. In the drawings:

FIG. 1 is a schematic wiring diagram of one turn signal duration timing system embodying the invention;

Figure 2:
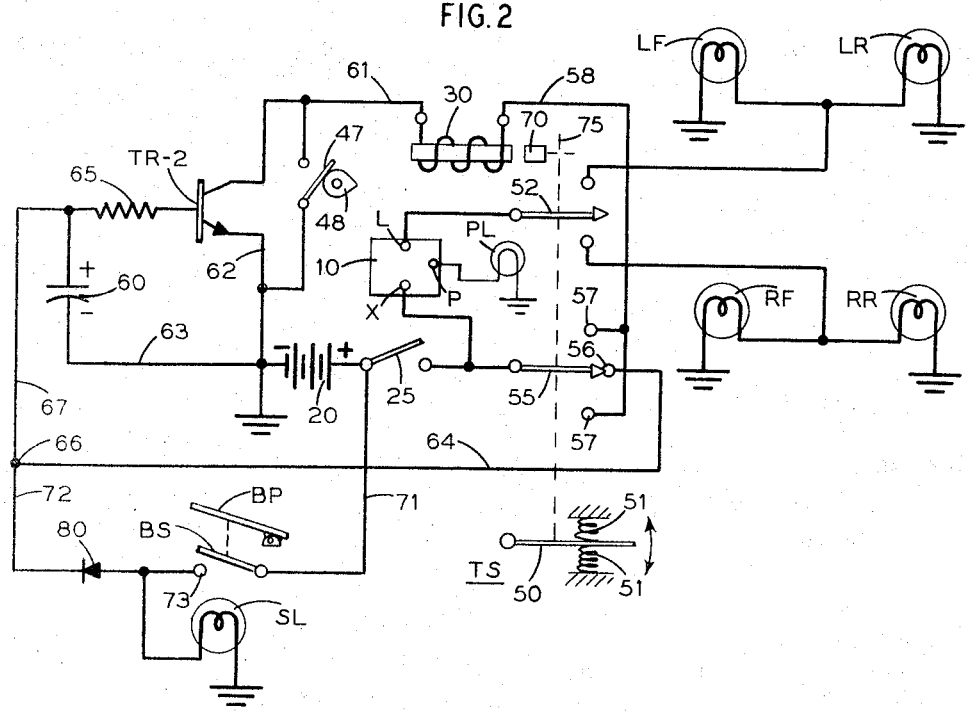
FIG. 2 is a schematic wiring diagram illustrating another embodiment of the invention.

Referring first to FIG. 1, the invention is illustrated as incorporated in a turn signal system including front signal lamps LF and RF and rear signal lamps LR and RR. The left and right signal lamps, at both ends of the vehicle, are arranged to be flashed, upon operation of a turn signal switch, through the medium of a flasher 10 which may be a thermomotive type of flasher, for example. Flasher 10 is illustrated as having one output contact connected to a pilot lamp PL for flashing of the pilot lamp in synchronization with flashing of either pair of signal lamps.

Selective energization of the signal lamps through flasher 10, to signal either a left turn or a right turn, is effected by a turn signal switch which includes a push button PBL, which is pushed when a left turn is to be signalled, a push button PBR, which is pushed when a right turn is to be signalled, and a cancel push button PBC which is pushed when it is desired to deactivate or discontinue the turn signalling. Each push button PBL and PBR is provided with a latch or lock member 15 which, when the corresponding push button is actuated, is arranged to be automatically latched to prevent release of the push button until the end of a predetermined time period in accordance with the invention.

The vehicle is illustrated as being provided with the usual brake pedal BP which, when operated, closes a brake light switch BS. Each push button switch PBL and PBR includes four movable contact arms 11, 12, 13 and 14, and push button switch PBC includes a movable contact arm 16. In the drawings, these contacts are illustrated in the position which they occupy when the turn signal system is inactive. Contacts 11 and 12, when the associated push button is operated, are moved into engagement with an associated fixed contact. However, contacts 13 and 14 are "skip" contacts which, upon operation of the associated push button, only momentarily engage a fixed contact and immediately disengage the latter, this occurring both upon operation of the push button and upon release thereof as explained more fully hereinafter.

The usual electrical system for the automotive vehicle is illustrated, in a schematic nature, as comprising a battery 20, and an ignition switch is indicated at 25.

Brake switch BS is connected, at a junction point 21, to the positive terminal of battery 20, and a conductor 22 connects the normally open contact of brake switch BS to a junction point 23 in a conductor 24. Conductor 24 interconnects the normally engaged contacts of movable contact arms 12. As illustrated in the drawing, it will thus be apparent that junction point 23 is connected, in the condition of the parts shown in FIG. 1, to the rear signal lamps LR and RR. Accordingly, when brake pedal BP is operated to apply the brakes, with resultant closure of brake switch BS, both rear lamps will be energized steady on. However, upon operation of either push button PBL or PBR to initiate a turn signalling operation, the respective movable contact arm 12 will be transferred to disengage the contact connected to conductor 24. This will "cut out" brake operation of the rear lamp LR or RR on that side of the vehicle on which a turn signal is to be flashed.

A conductor 26 connects terminal X of flasher 10 to the ignition switch 25 so that, when ignition switch 25 is closed, the potential of battery 20 is supplied to terminal X of flasher 10. The load terminal L of flasher 10 is connected to a junction point 27 in a conductor 28. This conductor 28 interconnects the movable contact arms 11 of the two push button switches. When either contact arm 11 is closed, it connects the corresponding front lamp LF or RF to the conductor 28 and thus, through junction point 27, to the load terminal L of flasher 10. Conductors 29 connect the back contacts of the respective movable contact arms 12 to the conductor 28. Consequently, when either movable contact arm 12 is transferred by operation of its corresponding push button, the corresponding rear lamp LR or RR is connected to conductor 28 and thus to the load terminal L of flasher 10.

With the system so far described, let it be assumed that push button PBL is depressed. This will transfer contact arms 11 and 12, as well as contact arm 13 to be mentioned hereinafter. Signal lamps LF and LR are thus connected, through conductor 28, to load terminal L of flasher 10. A circuit is thus completed for current flow through the flasher to the left signal lamps, and the left signal lamps will be flashed in accordance with the operation of flasher 10. At the same time, the rear left signal lamp LR is "cut out" of its energizing circuit controlled by brake switch BS. Thus, if the brakes are applied, only the right rear signal lamp RR will be energized "steady on" by closure of brake switch BS. Pilot lamp PL is flashed either in synchronism or in alternation with the flashing of the signal lamps, depending upon the particular construction of flasher 10. This pilot lamp is connected to pilot lamp terminal P of flasher 10.

As stated, when either push button PBR or PBL is activated, it is latched in its operative position until the end of the predetermined time period which may be extended provided the brake pedal BP is actuated to close the brake switch BS. This timing arrangement will now be described.

A PNP transistor TR-1 is provided, and its emitter is connected, through a junction point 19 in a positive bus 18, to a junction point 17 in conductor 26. Thus, whenever ignition switch 25 is closed, a positive potential of a preselected value is applied to the emitter of transistor TR-1. The base of transistor TR-1 is connected, at a junction point 34, to the ungrounded end of a grounded resistor 45. The collector of transistor TR-1 is connected, at a junction point 41, to one terminal of a solenoid 30 whose opposite terminal is grounded. Through an armature 31, solenoid 30, when energized, disengages spring biased catches 35 from latching engagement with latch 15 of the then operated push button PBL or PBR. A spring 37 normally biases catches 35 to the latching position. It will be understood that the illustration of latches 15 and catches 35 is schematic in nature, and does not represent the actual physical construction of such catches or latches or the actual physical interrelation thereof.

The actual components of the timing circuit include a condenser 40 and the resistance 45. The positive terminal of condenser 40 is connected to a junction point 42 in positive bus 18. The negative terminal of condenser 40 is connected at junction point 34 to the ungrounded terminal of resistance 45. A conductor 44 connects the movable contact arm 16 of the cancel push button PBC to junction point 42 in positive bus 18. This movable contact arm is a skip switch which, during operation of push button PBC, momentarily engages a fixed contact which is connected to junction point 41 connected to solenoid 30.

A conductor 43 interconnects left hand push button contacts 13 and 14 to right hand push button contacts 13 and 14, and a conductor 46 connects conductor 43 to a junction point 49 in positive bus 18. The fixed contacts momentarily engaged by movable arms 14 are interconnected by a conductor 33, and a conductor 38 connects a junction point 36 in conductor 33 to the junction point 34 on the negative side of condenser 40. The fixed contacts momentarily engaged by the movable arms 13 are interconnected by a conductor 39, and a conductor 32 connects conductor 39 to junction point 41 which is connected to the ungrounded terminal of solenoid 30.

To provide for instant termination of the timing interval, and thus immediate restoration of the turn signal system to its inactive or "ready" condition, upon return of the steering wheel to a straight ahead position, a switch 47 is provided and is connected through conductor 32 to junction point 41 connected to the ungrounded terminal of solenoid 30. An electrically conductive cam 48 is geared or otherwise connected to the steering wheel and has an operating projection 48A. Upon movement of the steering wheel in either direction from the straight ahead position, or upon return of the steering wheel in either direction to the straight ahead position, electrically conductive projection 48A momentarily engages switch 47. Cam 48 is connected to a junction point 49 in positive bus 18. Thus, responsive to engagement of projection 48A with switch 47, a positive potential will be applied to the ungrounded terminal of solenoid 30 to retract latches 35.

It is also desirable, as stated, that application of the vehicle brakes delay termination of the signalling operation. For this purpose, the brake switch BS is connected through a diode 80 and a conductor 81 to junction point 34 on the negative side of condenser 40. Thus, whenever brake pedal BP is depressed, a positive potential will be applied to junction point 34. Diode 80 is a gating diode which prevents back flow of current from junction point 34 to conductor 22 connected, through junction point 23 in conductor 24 and through armatures 12, to rear lamps LR and RR.

The timing arrangement operates in the following manner. When ignition switch 25 is closed, positive bus 18 is at the positive potential of battery 20. A potential is thus impressed across condenser 40 and the latter begins to charge. After a predetermined charging time as determined by the value of resistor 45, point 34 becomes sufficiently negative that a forward bias is applied to transistor TR-1 between the emitter and base thereof. This makes the emitter-collector circuit conductive and current flows through solenoid 30 to magnetize its armature 31 and thus retract latches 35 against the bias of springs 37. This is the steady or "ready state" of the timing arrangement.

Assuming that one of the push buttons PBL or PBR is operated to initiate the signalling of a projected turn, the contacts 11 and 12 thereof will be operated to connect the signal lamps on that side of the vehicle to flasher 10 for intermittent energization by the flasher. As the contacts 13 thereof momentarily close, a positive potential is applied to conductor 39 and thus, through conductor 32 and junction point 41, to solenoid 30 to energize the solenoid or to maintain it energized. At the same time, however, as contact 14 of the operated switch momentarily closes, a positive potential is applied to conductor 33 and thus, through junction point 36 and conductor 38, to point 34. This shorts or discharges condenser 40 to remove the forward bias from transistor TR–1 so that the latter becomes non-conductive and solenoid 30 is deenergized. This allows latches 35 to be spring biased into latching position to engage the operated latch 15.

Condenser 40 begins to re-charge and, after a predetermined charging time determined by the value of resistor 45, point 34 again becomes sufficiently negative to trigger or forward bias transistor TR–1 so that the emitter-collector circuit thereof is again made conductive to apply a positive potential to solenoid 30. Magnetization of armature 31 effects retraction of latches 35 and the operated push button is spring biased back to the off position. During such movement back to the off position, contacts 13 and 14 again momentarily close. The momentary closure of contact 14 will apply a positive potential to point 34 to short condenser 40. The momentary closure of contact 13 will again result in energization of solenoid 30 to maintain armature 31 magnetized to retract latches 35.

Should it be desirable to cancel the turn signal indication before the predetermined time interval has been elapsed, cancel push button PBC is pushed. The momentary closure of its skip contact 16 will apply a positive potential from junction point 42 to junction point 41 and thus to the ungrounded terminal of solenoid 30. This will magnetize armature 31 to retract latches 35 thus resulting in cancellation of the turn signal indication.

Another condition which may occur is that it may be desirable to change the turn indication from a left turn to a right turn or vice versa, and this particular situation may arise during changing of lanes. In such case, the pre-set time interval may not have yet expired. Assume that push button PBL has been operated to initiate the signalling of a proposed left turn. If it is now desired to signal a right turn, when returning to a lane, push button PBR is pressed. The momentary closure of skip contact 13 will, in this case, apply a positive potential to junction point 41 and thus energize solenoid 30 for retraction of latches 35 resulting in cancellation of the initial turn signalling indication. At the same time, push button PBR will be latched in its operated position. The momentary closure of switch contact 14 will, through point 36, conductor 38 and point 34, short condenser 40 so that the timing period will be re-started.

A further condition which may arise is that the vehicle may be halted at a traffic light, by operation of its brakes, before making the projected turn. In such case, the stopping of the vehicle by depressing brake pedal BP will close brake switch BS. The closure of brake switch BS will result in the application of a positive potential through diode 80 and conductor 81 to junction point 34 and thus short condenser 40. The re-charging of condenser 40, to reestablish the time interval, will not be initiated until such time as brake pedal BP is released.

Figure 3:
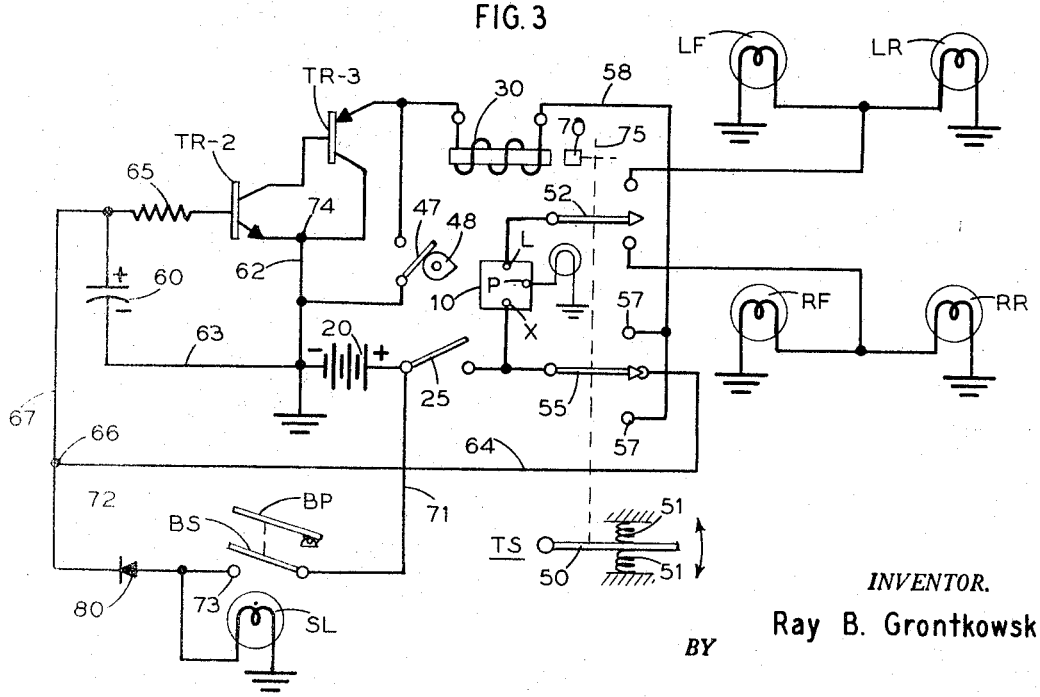
FIG. 3 is a schematic wiring diagram illustrating a modification of the embodiment of the invention shown in FIG. 2.

FIGS. 2 and 3 illustrate embodiments of the invention in which the time interval is determined by the discharge time of a condenser. In these figures, the same reference characters used in FIG. 1 have been used to indicate identical or corresponding parts.

Referring particularly to FIG. 2, a turn signal switch TS is indicated as having an operating handle 50 normally biased to a neutral position by springs 51 and as having a pair of movable contact arms 52 and 55. Contact arm 52 controls selective energization of the left or right signal lamps and, in the neutral position, maintains both sets of lamps disconnected from the L terminal of flasher 10, to which contact arm 52 is connected. Upon movement of arm 50 in either direction to indicate a projected turn, contact arm 52 will connect either the left lamps LF and LR or the right lamps RF and RR to the L terminal of flasher 10 for flashing of the lamps. The X terminal of flasher 10 is connected through ignition switch 25 to the plus terminal of battery 20, and the P terminal of the flasher is again connected to pilot lamp PL.

Contact arm 55, which is movable conjointly with contact arm 52 upon operation of arm 50, controls the timing circuit. Contact arm 55 is connected through ignition switch 25 to the positive terminal of battery 20. In the neutral position of switch TS, contact arm 55 is engaged with a central contact 56. When turn signal switch TS is operated to signal a turn in either direction, contact arm 55 is engaged with either of a pair of end contacts 57 which are commonly connected to one terminal of solenoid 30, through the medium of a conductor 58.

The time constant determining means in FIG. 2 includes a condenser 60 and a resistor 65 in operative associattion with a NPN transistor TR–2. A conductor 61 connects the collector of transistor TR–2 to the opposite terminal of solenoid winding 30, and a conductor 62 connects the emitter of transistor TR–2 to the negative terminal of battery 20, which is also grounded. Resistor 65 is connected in series between the positive terminal of condenser 60 and the base of transistor TR–2. A conductor 63 connects the negative terminal of condenser 60 to the negative terminal of battery 20. The movable contact arm 55 of turn signal switch TS is connected, through ignition switch 25, to the positive terminal of battery 20, and the intermediate contact 56 associated with contact arm 55 is connected, by a conductor 64, to a junction point 66 in a conductor 67 connected to the common junction of condenser 60 and resistor 65. Thus, in the neutral position of turn signal switch TS, a positive potential is applied across condenser 60 so that the latter is charged to its peak voltage.

In its charged state, condenser 60 maintains, through resistor 65, a base bias on transistor TR–2 of a value such that this transistor is non-conductive. When turn signal switch TS is moved to either of its operated positions, latch 70 engages catch 75 to latch switch TS in the operative position. In such operated position, contact 52 is connected to either the left lamps or the right lamps so that the connected lamps are flashed in synchronism or in alternation with the signal lamps, depending upon the particular type of operation of flasher 10.

At the same time, contact arm 55 disengages contact 56, thus removing the positive potential from condenser 60 so that the latter will begin to discharge, with its discharge time being controlled by the value of resistor 65. Such movement of contact arm 55 to engage either of its contacts 57 also applies a position potential to one terminal of solenoid 30. When condenser 60 has discharged to a voltage value sufficient to provide a base bias on transistor TR–2 making the latter conductive, solenoid 30 is energized as transistor TR–2 then becomes a closed switch connecting the other terminal of solenoid 30 to the negative grounded terminal of battery 20. Solenoid 30 thereupon withdraws latch 70 from engagement with catch 75, so that springs 51 restore switch TS to its neutral position. The flashing of the signal lamps is terminated, and condenser 65 is again re-charged to its peak value.

As in the embodiment of FIG. 1, means are provided to delay the initiation of the timing period if the vehicle steering wheel has been operated to initiate a turn or if the vehicle brakes are applied, as when the vehicle is delayed at a traffic light. Thus, the switch 47 is connected between the conductor 61 and the negative terminal of battery 20, and is open when the steering wheel is in other than a straight ahead position.

Should the steering wheel be returned to a straight ahead position, indicating that the turn has been completed, immediate cancellation of the turn signalling is effected as the steering wheel actuated cam 48 closes switch 47. This connects the left hand terminal of solenoid 30 directly to the negative terminal of battery 20, so that solenoid 30 is immediately energized to withdraw latch 70.

In the embodiment of FIG. 2, as well as in that of FIG. 3, separate brake pedal controlled stop lamps SL are provided for indicating braking of the vehicle. In FIG. 2, the switch BS operated by brake pedal BP is connected by a conductor 71 to the positive terminal of battery 20, and by a conductor 72 to junction point 66 which is connected to the positive terminal of condenser 60. A diode 80 is in series in conductor 72. Signal lamp SL is connected to the normally disengaged contact 73 of brake switch BS. When brake pedal BP is operated to apply the vehicle brakes, brake switch BS closes a circuit which applies a positive potential to the positive terminal of condenser 60 thus re-charging this condenser to its peak value. Also, brake switch BS applies a positive potential to the ungrounded terminal of the stop lamp or lamps SL so that these lamps are lit "steady on." The full charge is thereby maintained on battery 60 until such time as brake pedal BP is released to open brake switch BS. Then, the timing circuit operates in the normal manner to discharge condenser 60 and, after a predetermined time interval, makes transistor TR–2 conductive to effect energization of solenoid 30 and disengagement of latch 70.

Diode 80 is interposed in conductor 72 to prevent possible discharge of condenser 60 through lamp SL, and the diode 80 acts as a gating diode for forward flow of current toward condenser 60 but preventing reverse flow of current relative to condenser 60.

The embodiment of FIG. 3 differs from that of FIG. 2 only in that in a second transistor TR–3, which is a PNP transistor, is connected in series with transistor TR–2 so that, in effect, there is an amplification present. Conductor 61 connects the emitter of transistor TR–3 to the left hand terminal of solenoid 30, and the collector of transistor TR–3 is connected to conductor 62 at a junction point 74 to which the emitter of transistor TR–2 is also connected. A conductor 76 connects the collector of transistor TR–2 to the base of transistor TR–3.

In this arrangement, the conductivity of transistor TR–2 is controlled in the same manner as in the embodiment of FIG. 2, by the potential of condenser 60. Transistor TR–2, in the circuit configuration illustrated, in turn controls the conductivity of transistor TR–3. Thus, when transistor TR–2 becomes conductive, transistor TR–3 is also made conductive due to a forward bias being applied to its base. This, in turn, provides for sufficient current flow through solenoid 30 for the latter to attract latch 70 to disengage the latter from catch 75.

In each of the three embodiments illustrated in the drawings, the solenoid has been illustrated as controlling the operation of a latch to release a turn signal switch for biased return to a neutral position. However, it will be appreciated that it is within the scope of this invention that the solenoid, or other equivalent means, instead of being used to operate a latch effective upon the turn signal switch could be utilized equally well to initiate operation of a signal, such as a light or a sounding device, which would indicate the expiration of a predetermined period of operation of the turn signalling means.

While specific embodiments of the invention have been shown and described in detail to illustrate the application of the principles of the invention, it will be understood that the invention may be embodied otherwise without departing from such principles.

What is claimed is:

1. An automotive vehicle turn signalling system comprising, in combination, a source of D.C. potential; left and right turn signal lamps each having one terminal connected to one terminal of said source; a cyclically operable circuit interrupter having an input terminal connected to the opposite terminal of said source; a turn signal switch selectively operable between a neutral position and either of a pair of operated positions to connect the other terminals of either the left or right signal lamps to an output terminal of said circuit interrupter to selectively flash the thus connected signal lamps; electric current responsive time determining means operable to signal the termination of a predetermined signalling time interval; a transistor electrically connected to said source and said time determining means and controlling current flow to the latter; timing means connected to said source and said transistor and controlling the bias of the latter, said timing means being effective, after a predetermined period of activation, to adjust the bias applied to said transistor to a value such that the current flow to said time determining means will effect operation thereof to signal the termination of the predetermined signalling time interval; means operatively interconnecting said turn signal switch, said source and said timing means and operable, upon operation of said turn signal switch to either of its operated positions, to initiate activity of said timing means; and override means connected to said source and said timing means and operable, responsive to a selected operated position of an instrumentality controlling the motion of the vehicle, to render ineffective the control of said timing means on said transistor.

2. An automotive vehicle turn signalling system, as claimed in claim 1, in which said override means comprises a normally open switch closed upon operation of the brake pedal to apply the vehicle brakes.

3. An automotive vehicle turn signalling system, as claimed in claim 1, in which said override means comprises a switch and a cam operable by the steering wheel of the vehicle, said cam operating said switch to the override position upon return of the steering wheel to a straight ahead position.

4. An automotive vehicle turn signalling system as claimed in claim 1, including means biasing said turn signal switch to the neutral position; said current responsive time determining means including a solenoid and a latch operable by said solenoid; said latch latching said turn signal switch in either of its operated positions and being disengaged upon such operation of the time determining means.

5. An automotive vehicle turn signalling system, as claimed in claim 1, in which said turn signal switch includes first selectively operable contact means controlling connection of said signal lamps to said output terminal of said circuit interrupter, and second contact means movable conjointly with said first contact means and constituting said activation initiating means for said timing means.

6. An automotive vehicle turn signalling system, comprising, in combination, a source of D.C. potential; left and right turn signal lamps each having one terminal connected to one terminal of said source; a cyclically operable circuit interrupter having an input terminal connected to the opposite terminal of said source; a turn signal switch including first contact means operable to connect the other terminals of either the left or right signal lamps to an output terminal of said circuit interrupter to selectively flash the thus connected signal lamps; electric current responsive time determining means operable to signal the termination of a predetermined signalling time interval, said time determining means including a solenoid and means operable by said solenoid in accordance with a condition of current flow through said solenoid, one terminal of said solenoid being grounded; a PNP transistor having its emitter connected to the positive terminal of said source and its collector connected to the ungrounded terminal of said solenoid; a condenser having a positive terminal connected to the positive terminal of said source and a negative terminal connected to the base of said transistor; normally open second contact means included in said turn signal switch and conjointly movable with said first contact means; means connecting said second contact means between the positive terminal of said source and the negative terminal of said transistor; said second contact means being momentarily closed during each operation of said first contact means, to short said condenser; and a grounded resistor having its ungrounded terminal connected to the negative terminal of said condenser, said resistor determining the charging time of said condenser; said condenser in response to said momentary short circuiting completely discharging and thereafter starting to re-charge; said negative terminal of said condenser, after predetermined charging of said condenser, attaining a negative potential such as to trigger said transistor conductive for flow of current through the emitter-collector circuit thereof to said solenoid to energize the latter to operate said means.

7. An automotive vehicle turn signalling system, as claimed in claim 6, including a normally open switch closed upon operation of the vehicle brake pedal to apply the vehicle brakes; said normally open switch being connected between the positive terminal of said source and the negative terminal of said condenser so that, upon application of the vehicle brakes, said condenser is discharged.

8. An automotive vehicle turn signalling system, as claimed in claim 7, including a normally open switch connected between the positive terminal of said source and the ungrounded terminal of said solenoid; and a cam operable by the steering wheel of said vehicle, said cam, when the steering wheel moves in either direction relative to a straight ahead position, momentarily closing said normally open switch to energize said solenoid.

9. An automotive vehicle turn signalling system, comprising, in combination, a source of D.C. potential; left and right turn signal lamps each having one terminal connected to one terminal of said source; a cyclically operable circuit interrupter having an input terminal connected to the opposite terminal of said source; a turn signal switch including first contact means selectively operable between a neutral position and either of a pair of operated positions to connect the other terminals of either the left or right signal lamps to an output terminal of said circuit interrupter to selectively flash the thus connected signal lamps; electric current responsive time determining means operable to signal the termination of a predetermined signalling time interval, and including a solenoid and a signal means operable responsive to de-energization of said solenoid; a NPN transistor having its collector connected to one terminal of said solenoid and its emitter connected to the negative terminal of said battery; a condenser connected between the base of said transistor and the negative terminal of said battery; a second contact means included in said turn signal switch and movable conjointly with said first contact means between a neutral position and a pair of operated positions; said second contact means, in its neutral position, connecting the positive terminal of said source to the positive terminal of said condenser and, in either of its operated positions, disconnecting the positive terminal of said source from the positive terminal of said condenser and connecting the positive terminal of said source to the other terminal of said solenoid; whereby said condenser will be normally charged to a peak voltage value to bias said transistor to a non-conductive state and, upon operation of said turn signal switch to either of its operated positions, said condenser will discharge and, after a predetermined discharge, will establish a base bias for said transistor sufficient for current flow in the emitter-collector circuit thereof to energize said solenoid to activate said signal means.

10. An automotive vehicle turn signalling system, as claimed in claim 9, including a normally open brake pedal operated switch having a first contact connected to the positive terminal of said source and a second contact; a stop lamp connected between said second contact and the negative terminal of said source; and means connecting said second contact to the positive terminal of said condenser; whereby, upon operation of the vehicle brake pedal, said condenser is re-charged to its peak value.

11. An automotive vehicle turn signalling system, as claimed in claim 10, including a gating diode connected between said second terminal of said brake switch and the positive terminal of said condenser and polarized to provide for current flow from said second contact to the positive terminal of said condenser.

12. An automotive vehicle turn signalling system, as claimed in claim 9, including a normally open switch connected in parallel with the emitter-collector circuit of said transistor; and cam means operated by the vehicle steering wheel and effective, when the steering wheel is in a straight-ahead position, to close said last-named normally open switch to complete a direct energization circuit for said solenoid.

13. An automotive vehicle turn signalling system, as claimed in claim 9, including a PNP transistor having its base connected to the collector of said NPN transistor and its emitter connected to said one terminal of said solenoid, the collector of said PNP transistor being connected to the negative terminal of said battery; said last-named normally open switch being connected in parallel with the emitter-collector circuit of said PNP transistor.

References Cited by the Examiner

UNITED STATES PATENTS

| 2,308,097 | 1/1943 | Murray | 340—56 |
| 3,060,407 | 10/1962 | Beiswenger | 340—74 |
| 3,110,011 | 11/1963 | Burson | 340—56 |
| 3,128,447 | 4/1964 | Eaves | 340—56 |

NEIL C. READ, *Primary Examiner.*

T. A. ROBINSON, *Assistant Examiner.*